United States Patent Office 2,711,401
Patented June 21, 1955

2,711,401

STABILIZED CHLORINE CONTAINING VINYL RESINS

Robert E. Lally, Bedford, Ohio, assignor to Ferro Corporation, Cleveland, Ohio, a corporation of Ohio No Drawing. Application November 23, 1951, Serial No. 257,943

8 Claims. (Cl. 260—45.75)

This invention is a continuation-in-part of my present application bearing Serial Number 159,650 dated May 2, 1950.

This invention relates to new compositions of matter and more particularly to chlorine containing vinyl resins which are resistant to the degradation effects of light and heat.

In general, chlorine containing vinyl resins, such as, polyvinyl chloride, copolymers of vinyl chloride, etc. have very poor resistance to the effects of heat and/or light. It is well known to those skilled in the art that severe exposure, of the chlorine containing vinyl resins, to heat and/or light brings about discoloration, brittleness and loss of strength. This degradation is especially pronounced during the various fabrication processes such as injection molding, calendering, etc.; operations which require heating of plastic compositions.

It is, therefore, the principal object of the present invention to provide chlorine containing vinyl resins which are substantially resistant to the degradation effects of heat and/or light.

A further object of this invention is to provide stabilizing agents which are economical and easy to incorporate into the chlorine-containing vinyl resins.

Other objects will become apparent as the description proceeds.

To the accomplishment of the foregoing and related ends, the invention then, comprises the features hereinafter fully described and particularly pointed out in the claims, the following description setting forth in detail certain illustrative embodiments of the invention, these being indicative, however, of but a few of the ways in which the principle of the invention, may be employed.

Broadly stated this invention comprises a new composition of matter comprising an admixture of from about 1 to about 5 parts of a organo-salt of a metal selected from the class of magnesium, calcium, strontium, barium, zinc, cadmium, mercury, tin and lead and from about 1 to about 5 parts of a compound selected from the class of aliphatic polyhydric alcohols having at least two and not more than nine hydroxyl groups and a boiling point not less than 250° F., esters of aliphatic polyhydric alcohols said esters having at least two and not more than nine hydroxyl groups and a boiling point not less than 250° F. and ethers of aliphatic polyhydric alcohols said ethers having at least two and not more than nine hydroxyl groups, and a boiling point not less than 250° F.

From the foregoing broad statement it can be readily seen that the stabilizer of this invention is an admixture of a metallic soap and a aliphatic polyhydric compound. We have found that neither of these substances alone are entirely satisfactory as stabilizing agents for chlorine containing vinyl resins, but by combining these aforementioned substances a synergistic effect is obtained which makes these mixtures outstanding as stabilizing agents.

The metals which may be used in the preparation of the metallic salts include the following:

TABLE I

*Heavy metals*

Magnesium
Zinc
Cadmium
Mercury
Tin
Lead

*Alkaline earth metals*

Calcium
Barium
Strontium

The acids which may be used with any of the metals given in Table I above in the preparation of the metallic salts or soaps include the following representative acids:

TABLE II

*Aliphatic acids*

Saturated:
  Acetic
  Propionic
  Stearic
  Palmitic
  Lauric
  2 ethyl-hexoic

Unsaturated:
  Linoleic
  Linolenic
  Oleic
  Ricinoleic

*Cycloaliphatic acids*

Naphthenic

*Complex acids*

Tall oil
Rosin oil
Rosin

Commercially available acids which are in many cases, mixtures of certain of the above named, together with small amounts of other acids, are generally useful in the preparation of the metallic soaps.

Any one or more of the metals previously identified may be used with any one or more of the acids named above, in the preparation of organo-metallic salts which form one component of the compositions of this invention.

In the following table are given a number of specific examples of organometallic salts which will be found highly useful:

TABLE III

Zinc 2 ethyl-hexoate
Zinc naphthenate
Zinc ricinoleate
Zinc tallate
Zinc acetate
Zinc propionate
Calcium acetate
Calcium propionate
Cadmium 2 ethyl-hexoate
Cadmium naphthenate
Cadmium ricinoleate
Cadmium tallate
Barium 2 ethyl-hexoate
Barium naphthenate
Barium ricinoleate
Barium tallate The polyhydric compounds which have been found particularly useful in this invention are given in the following table:

TABLE IV

Glycol
Glycerol
Sorbitol
Pentaerythritol
Glyceryl mono-stearate
Glyceryl mono-oleate
Glycol diethyl ether
Glyceryl monophenyl ether I have found that the ratio of polyhydric compound to the organo-metallic salt may vary from a ratio of 1:5 to a ratio of 5:1. However, in the preferred embodiments of our invention we use a ratio of one part of the polyhydric compound to one part of the organo-metallic salt the total amount of stabilizer may range from about 0.5% to about 8.0% by weight based on the weight of the chlorine containing vinyl resin. Generally the best results are obtained by the use of from 0.5% to 5% of the stabilizing agent.

The stabilizing agent may be incorporated by a number of methods. It may be added to the solid resin and mixed therein by means of hot rolls or other mixing machines adapted to mix solid resins. It may be also dissolved in a suitable solvent and then mixed with the resin, or the solution of the stabilizer may be mixed with a solution of the resin. The only important requisite is that the stabilizer and resin are thoroughly mixed and dispersion is as complete as possible.

So that the synergistic effect of the combination of the organo-metallic salt and the polyhydric compound is more readily understood the following examples are given:

EXAMPLE I

Standard compositions of 100 parts of polyvinyl chloride polymer and 47 parts of plasticizer (dioctylphthalate) were thoroughly mixed. To one such composition there was incorporated, 3% by weight on the resin content, of glycerol; to a second batch of the same resin composition was added an equal amount of cadmium 2 ethyl-hexoate, and to a third batch of the same resin composition was added an equal amount of an admixture of one part of glycerol and one part of cadmium 2 ethyl-hexoate. After incorporation into the resin-plasticizer mix the compositions were milled ten minutes on a hot roll mill to obtain smooth films. These films were then compared in stability by observation of color changes over a three hour period at 300° F. The following results were noted:

A. The resin composition containing the glycerol turned dark amber after 3 hours at 300° F.

B. The resin composition containing the cadmium 2 ethyl-hexoate turned black after 3 hours at 300° F.

C. The resin composition containing the admixture of glycerol and cadmium 2 ethyl hexoate remained colorless after 3 hours at 300° F.

EXAMPLE II

The same procedure as in Example I was followed, using glyceryl monostearate, cadmium 2 ethyl-hexoate and an admixture of one part of glyceryl monostearate and one part of cadmium 2 ethyl-hexoate.

The following results were noted:

A. The composition containing the glyceryl monostearate turned dark amber.

B. The composition containing the cadmium 2 ethyl-hexoate turned black.

C. The composition containing the admixture of glyceryl monostearate and cadmium 2 ethyl-hexoate remained colorless.

EXAMPLE III

The same procedure as in Example I was followed, using sorbitol, cadmium 2 ethyl-hexoate and a admixture of one part of sorbitol and one part of cadmium 2 ethyl-hexoate.

The following results were noted:

A. The composition containing the sorbitol turned dark amber.

B. The composition containing the cadmium 2 ethyl-hexoate turned black.

C. The composition containing the admixture of sorbitol and cadmium 2 ethyl-hexoate remained colorless.

EXAMPLE IV

The same procedure as in Example I was followed, using pentaerythritol, barium ricinoleate and an admixture of part of pentaerythritol and one part of barium ricinoleate.

The following results were noted:

A. The composition containing the pentaerythritol turned dark amber.

B. The composition containing the barium ricinoleate turned dark yellow.

C. The composition containing the admixture of pentaerythritol and barium ricinoleate remained colorless.

EXAMPLE V

The same procedure as in Example I was followed, using pentaerythritol, zinc 2 ethyl-hexoate, and an admixture of one part of pentaerythritol and one part zinc 2 ethyl-hexoate.

The following results were noted:

A. The composition containing the pentaerythritol turned dark amber.

B. The composition containing the zinc 2 ethyl-hexoate turned black.

C. The composition containing the admixture of pentaerythritol and zinc 2 ethyl-hexoate turned very slightly yellow.

EXAMPLE VI

The same procedure as in Example I was followed, using glyceryl monophenyl ether, barium propionate, and an admixture of one part of glyceryl monophenyl ether and one part of barium propionate.

The following results were noted:

A. The composition containing the glyceryl monophenyl ether turned dark amber.

B. The composition containing the barium propionate turned black.

C. The composition containing the admixtures of glyceryl monophenyl ether and barium propionate remained colorless.

The stabilizers of this invention can be incorporated into chlorine containing vinyl resins alone or in conjunction with pigments, plasticizers, dyes, fillers, etc.

Other modes of applying the principle of the invention may be employed, change being made as regards the details described, provided the features stated in any of the following claims or the equivalent of such be employed.

I, therefore, particularly point out and distinctly claim as my invention:

1. A composition of matter comprising a chlorine containing vinyl resin and from about 0.5% to about 8.0% by weight, based on said resin, of a stabilizer, said stabilizer comprising an admixture of from about 1 to about 5 parts of a salt of a carboxylic acid of the class consisting of the aliphatic and cycloaliphatic carboxylic acids and mixtures thereof with a metal selected from the class consisting of magnesium, calcium, strontium, barium, zinc, cadmium, mercury, tin and lead and from about 1 to about 5 parts of a compound selected from the class consisting of aliphatic polyhydric alcohols having at least two and not more than nine hydroxyl groups and a boiling point not less than 250° F., esters of aliphatic polyhydric alcohols said esters having at least two and not more than nine hydroxyl groups and a boiling point not less than 250° F. and ethers of aliphatic polyhydric alcohols said ethers having at least two and not more than nine hydroxyl groups and a boiling point not less than 250° F.

2. A composition of matter comprising a chlorine containing vinyl resin and from about 0.5% to about 8.0% by weight, based on said resin, of a stabilizer, said stabilizer comprising and admixture of from about 1 to about 5 parts of a oil soluble salt of a carboxylic acid of the class consisting of the aliphatic and cycloaliphatic carboxylic acids and mixtures thereof with a metal selected from the class consisting of magnesium, calcium, strontium, barium, zinc and cadmium, mercury, tin and lead, and from about 1 to about 5 parts of a compound selected from the class consisting of aliphatic polyhydric alcohols having at least two and not more than nine hydroxyl groups and a boiling point not less than 250° F., esters of aliphatic polyhydric alcohols said esters having at least two and not more than nine hydroxyl groups and a boiling point not less than 250° F. and ethers of aliphatic polyhydric alcohols having said ethers at least two and not more than nine hydroxyl groups and a boiling point not less than 250° F.

3. A composition of matter comprising a chlorine containing vinyl resin and from about 0.5% to about 8.0% by weight, based on said resin, of a stabilizer, said stabilizer comprising and admixture of from about 1 to about 5 parts of a water-soluble salt of a carboxylic acid of the class consisting of the aliphatic and cycloaliphatic carboxylic acids and mixtures thereof with a metal selected from the class consisting of magnesium, calcium, strontium, barium, zinc and cadmium, mercury, tin and lead, and from about 1 to about 5 parts of a compound selected from the class consisting of aliphatic polyhydric alcohols having at least two and not more than nine hydroxyl groups and a boiling point not less than 250° F., esters of aliphatic polyhydric alcohols said esters having at least two and not more than nine hydroxyl groups and a boiling point not less than 250° F. and ethers of aliphatic polyhydric alcohols said ethers having at least two and not more than nine hydroxyl groups and a boiling point not less than 250° F.

4. A composition of matter comprising a chlorine containing vinyl resin and from about 0.5% to about 8.0% by weight, based on said resin, of a stabilizer, said stabilizer comprising an admixture of from about 1 to about 5 parts of cadmium 2 ethyl-hexoate and from about 1 to about 5 parts of glycerol.

5. A composition of matter comprising a chlorine containing vinyl resin and from about 0.5% to about 8.0% by weight, based on said resin, of a stabilizer, said stabilizer comprising an admixture of from about 1 to about 5 parts of cadmium 2 ethyl-hexoate and from about 1 to about 5 parts of glyceryl monostearate.

6. A composition of matter comprising a chlorine containing vinyl resin and from about 0.5% to about 8.0% by weight, based on said resin, of a stabilizer, said stabilizer comprising an admixture of from about 1 to about 5 parts of cadmium 2 ethyl-hexoate and from about 1 to about 5 parts of sorbitol.

7. A composition of matter comprising a chlorine containing vinyl resin and from about 0.5% to about 8.0% by weight, based on said resin, of a stabilizer, said stabilizer comprising an admixture of from about 1 to about 5 parts of barium ricinoleate and from about 1 to about 5 parts of pentaerythritol.

8. A composition of matter comprising a chlorine containing vinyl resin and from about 0.5% to about 8.0% by weight, based on said resin, of a stabilizer, said stabilizer comprising an admixture of from about 1 to about 5 parts of zinc 2 ethyl-hexoate and from about 1 to about 5 parts of pentaerythritol.

References Cited in the file of this patent

UNITED STATES PATENTS 2,102,825    Woodhouse et al. _____ Dec. 21, 1937